Patented June 20, 1944

2,352,047

UNITED STATES PATENT OFFICE 2,352,047

FLEXIBLE VALVE SEAT CONSTRUCTION

Arthur M. Wahl, Wilkinsburg, and Frederick B. Johnson, Clairton, Pa., assignors to Westinghouse Electric & Manufacturing Company, East Pittsburgh, Pa., a corporation of Pennsylvania Application October 30, 1941, Serial No. 417,146

12 Claims. (Cl. 251—167)

This invention relates generally to valve constructions and, as specifically illustrated in this specification, concerns improvements in the valve construction of compressed gas circuit breakers. More specifically, the present invention concerns improved resilient valve seats and is here illustrated as applied to the valve seat construction of the gas blast type of circuit interrupter, said circuit interrupter employing compressed gas to extinguish the arc drawn on the contacts of said interrupter when it is opened.

Circuit interrupters which are operated by compressed air or other gases are very common. The compressed air or other gas is used to open the circuit interrupter quickly when valves controlling the air or other gas are operated. Frequently the gas is also used to help extinguish the arc produced when the circuit interrupter is opened. In such an application of the gas there must be provided suitable valves which open and close automatically in response to the opening and closing of the circuit interrupter. It is a difficult problem to provide a valve construction in such a circuit interrupter which will be reliable, respond quickly, the valve not sticking to the seat, and after many operations remaining gas tight. Since the moving parts of such circuit interrupters are generally heavy, the kinetic energy stored in the moving parts during rapid operation of said interrupters is high. When the moving parts are brought to a quick stop, stresses and strains are present in the materials which tend to cause permanent deformation of the parts. This tendency is very noticeable in the rapid operation of valves in compressed gas circuit interrupters. The present invention eliminates such problems by a novel valve construction.

The main object of the present invention is to provide an improved valve construction. This valve construction is illustrated by showing its use in a gas blast type circuit interrupter. However, such a novel valve construction has many other uses than the particular use illustrated. It may be used on other types of apparatus, but merely for purposes of illustration it is here shown as used in a gas blast type of circuit interrupter.

A further and more specific object of the present invention resides in the provision of a novel resilient seat for a valve. The consequence of the present novel valve construction is to permit a dissipation of the considerable amount of kinetic energy stored in the rapidly moving valve when it strikes the valve seat, thus eliminating a permanent deformation of the valve and valve seat and a resulting leakage of gas through the valve.

Other objects and advantages will become apparent in the following description when considered in conjunction with the accompanying drawings, in which:

Figure 1 is a side elevational view, partly in section, of a gas blast type of circuit interrupter employing one modification of the present invention. The illustrated circuit interrupter in Fig. 1 is more fully described in an application of A. H. Bakken, Serial No. 313,745, filed January 13, 1940, now U. S. Patent No. 2,282,154, issued May 5, 1942, and assigned to the assignee of the instant application. It is also described more completely in an application of R. C. Cunningham and B. P. Baker, Serial No. 357,686, filed September 21, 1940, now U. S. Patent No. 2,294,824, issued September 1, 1942, and assigned to the assignee of the instant application;

Figure 1:
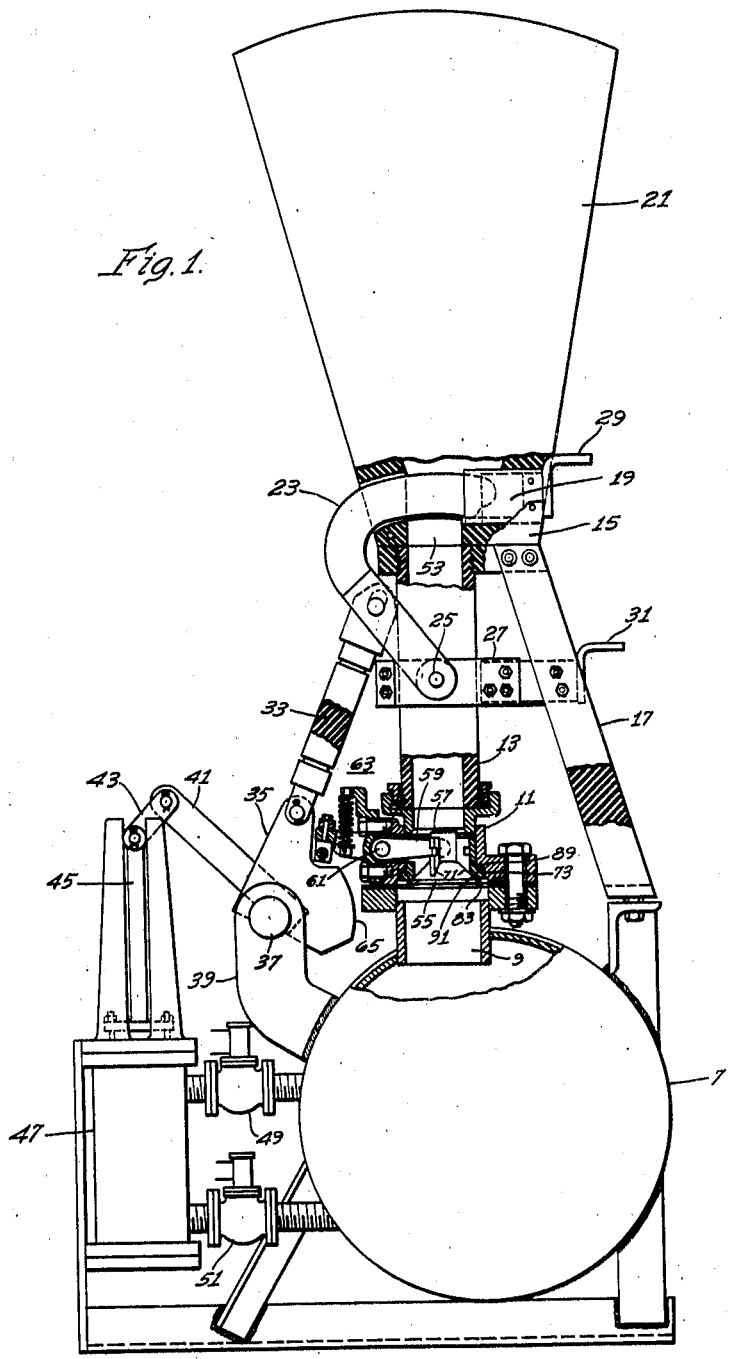

Referring to the drawings, particularly to Fig. 1, the reference numeral 7 designates a tank for storing gas, such as air, under pressure. Extending from the upper end of the tank 7 is a relatively short flanged conduit 9 which, in turn, carries a valve casing 11. Secured to the upper end of the valve casing 11 is a tubular insulator 13 which has secured to its upper end an insulating support 15. The insulating support 15 may be given additional support by an insulating member 17. The support 15 carries a stationary contact assembly 19 which is enclosed within an arc extinguishing structure 21. The arc extinguishing structure 21 is of conventional design.

Coacting with the stationary contact assembly 19 is a movable contact 23 which is preferably of blade-like construction and generally C-shaped, and mounted for swinging movement about a pivot 25 carried by a conducting bracket 27. External circuit connections to the interrupter are made through a pair of terminal members 29 and 31, the first of which is secured to the stationary contact assembly 19, and the second one of which is connected to the conducting bracket 27. Thus, when the interrupter is in the closed circuit position as is shown in Fig. 1, an electrical circuit is established between the terminals 29 and 31 through the stationary contact 19, the movable contact 23 and the conducting bracket 27.

The movable contact 23 is actuated to open and closed circuit positions by an insulating operating rod 33 actuated by a crank arm 35 carried by a shaft 37, in turn journaled in a suitable bracket 39. The shaft 37 is actuated by a crank arm 41 coupled by suitable linkage 43 to the connecting rod 45 of an air or gas actuated piston operated within the cylinder 47. The connecting rod 45 may be moved up and down to effect the respective closing and opening movement of the movable contact 23 by the admission of compressed gas from the tank 7 through solenoid operated valves 49 and 51. Mechanically operated valves could, of course, be used in place of the solenoid operated valves 49 and 51.

The tubular insulator 13, in addition to serving as a support, also provides a passage for transmitting an arc extinguishing blast of gas from the storage tank 7 to the space between the contacts 19 and 23. This gas blast passage proceeds through the short conduit 9, through the valve casing 11, through the tubular insulator 13, and opening 53 through the insulating support 15 which is preferably coextensive with the passage within the tubular insulator 13.

In the event the moving contact 23 is moved to the open circuit position while the circuit interrupter is carrying load, an arc will be drawn across the upper end of passage 53 and will be subjected to a blast of arc extinguishing gas caused to flow through the tubular insulator 13, whereby the arc will be extinguished. Control of the blast of gas to the arc may be obtained by a valve 55 disposed in the lower end of the valve casing 11. The valve 55 has a stem 57 operatively coupled to one end of an actuating member 59. The actuating member 59 is rigidly secured to a rock shaft 61 journaled in the side of the valve casing 11. The shaft 61 extends exteriorly of the casing 11, and is actuated by suitable mechanism, indicated generally by the reference numeral 63, so that valve 55 opens only during a part of the opening movement of the circuit interrupter. Consequently, the arc drawn on the contacts 19 and 23 of the circuit interrupter during the opening movement thereof is subjected to a blast of arc extinguishing gas from the storage tank 7.

The mechanism, indicated generally by the reference numeral 63, is actuated by a cam 65 which is an integral part of the crank arm 35. The details of mechanism 63 are not a part of the present invention. These details are fully set forth and are claimed in an application of R. C. Cunningham and B. P. Baker, Serial No. 357,686, filed September 21, 1940, now U. S. Patent No. 2,294,824, issued September 1, 1942, and assigned to the assignee of the instant application. It suffices here to say that the mechanism 63 operates to open valve 55 only during a part of the opening movement of the circuit interrupter. This mechanism operates to open valve 55 and permit the flow of arc extinguishing gas even where the contacts, closed under overload conditions, are again moved to the open position through relay action without having touched each other.

The gas blast type of circuit interrupter, illustrated in Fig. 1, is shown to indicate the type of electrical apparatus upon which it is possible to use the present invention. The present invention can, however, be used on any apparatus which employs valves for fluid control.

Figure 2:
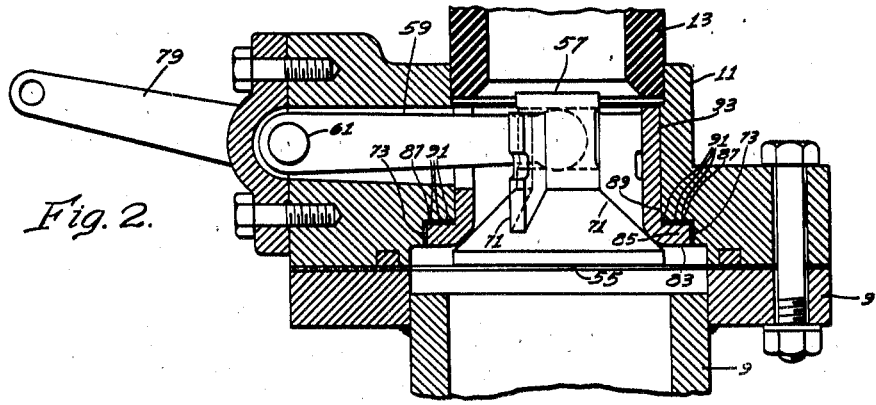
Fig. 2 is an enlarged side elevational view, partly in section, of the valve construction shown in Fig. 1.

Fig. 2 is an enlarged side elevational view, partly in section, of the valve construction shown in Fig. 1. Referring to Fig. 2, which shows more clearly than Fig. 1 the novel valve construction of the present invention, there is provided a valve 55 so designed as to have increased weight and strength. Three spaced supports 71 (two of which are shown in Fig. 2) are cast integrally with valve 55 to increase its strength and weight. The valve 55 is operatively coupled with one end of an actuating member 59. The actuating member 59 is rigidly secured to a rock shaft 61 journaled to the side of the valve casing 11. The rock shaft 61 is rotated by a member 79 which is actuated by the mechanism indicated generally by the reference numeral 63 in Fig. 1, but not shown in Figs. 2, 3 or 4 of the drawings.

The valve casing 11 is machined to permit the insertion of a tubular-shaped insert 83. The insert 83 is made of high strength material and is retained in position within the valve casing 11 by brazing carefully only the outer periphery of the flange-shaped portion 85 of the tubular-shaped insert 83 to the casing 11, using silver solder 73. In the brazing process particular pains are taken to obtain a good brazing job and still to prevent the silver solder 73, used in the brazing process, from flowing into the small horizontal air gap, indicated by reference numeral 87, between the valve casing 11 and the tubular-shaped insert 83, and also to insure the prevention of any silver solder flowing between insert 83 and valve casing 11 at the point indicated by reference numeral 89. To accomplish this, strings of asbestos, indicated by reference numeral 91, are placed about the insert 83 before it is inserted into the valve casing 11. Asbestos washers, not shown, could, of course, be used in place of the asbestos strings 91. The friction between the valve seat insert 83 and the casing 11 tends to damp the oscillations on closing where the external valve mechanism does not sufficiently damp the oscillations.

The result of the valve construction illustrated in Fig. 1 and Fig. 2 is that the tubular-shaped insert 83 is rigidly held to the valve casing 11 only at the outer periphery of the flange-shaped portion 85. It is thus apparent that the tubular portion, indicated by reference numeral 93, and constituting the actual valve seat is free to move up and down under the impact caused by the closing of valve 55.

Thus the insert 83, while being maintained in fixed relation to casing 11 under static conditions, will give sufficiently under high energy impact to provide the flexibility necessary to permit the valve seat to absorb the energy without permanent deformation. The stresses at the valve seat are reduced to such an extent that no permanent deformation of either the valve 55 or the insert 83 is caused, and the valve always remains gas tight. It will be noted that since insert 83 constitutes the valve seat, the material out of which the valve casing 11 is made is not important, the valve casing 11 merely furnishing a foundation for the insert 83, the latter of which takes the impact caused by valve 55 closing.

It has been found that good results can be obtained without using silver solder but merely using soft solder. Silver solder is, however, preferable. The asbestos strings 91 or asbestos washers can be omitted entirely with good results. Their use merely provides an insurance against the possible flow of the solder 73. The air gap 87 may be increased and a brass ring (not shown) placed between the flange portion 85 of insert 83 and valve casing 11. The brass, being resilient, will not impede the resilient feature of the insert 83, and the use of a brass ring is desirable where space is not at a premium, and a large air gap between the insert 83 and the valve casing 11 is desired. The brass ring gives some support to the valve seat portion of insert 83 yet does not affect the resilient operation of the insert 83 because of the resilient characteristic of the metal brass. The use of a brass ring is not illustrated in the drawings, Fig. 1 and Fig. 2 merely showing an application of the invention where space is at a premium.

If the insert 83 is soldered to the valve casing 11 throughout its entire length, that is, if the insert 83 is not only soldered to valve casing 11 at the periphery of its flange portion 85, but also along the external tubular portion 89, then naturally the insert 83 is entirely rigid with respect to casing 11 and the valve seat will be non-resilient and hence unsatisfactory. To get the good results obtained by the use of the valve construction illustrated in Fig. 1 and Fig. 2, the valve seat portion of insert 83 must be resilient, and this requirement prohibits the soldering of insert 83 to valve casing 11 at any place along the longitudinal portion 93 of insert 83. It would, of course, be possible to obtain the same good results produced by the valve construction in Fig. 1 and Fig. 2 if more or less of the flange portion 85 were soldered to valve casing 11, the essential feature being that at least part of the flange portion 85 be soldered to valve casing 11, the longitudinal tubular portion 93 remaining unsoldered and free to move longitudinally.

The novel valve construction illustrated in Fig. 1 and shown enlarged in Fig. 2 has eliminated the problem present in previous valve constructions, namely the prevention of permanent deformation of both the valve and the valve seat under conditions of high speed operation of the circuit interrupter. In previous valve constructions the high amount of kinetic energy stored in the rapidly moving valve would cause a permanent deformation of both the valve and the valve seat. As a consequence of such permanent deformation, the valve no longer would hold air or other gas satisfactorily. Making the valve and the valve seat of a higher strength alloy produced no apparent improvement in the operation of the circuit interrupter. The dissipation of the considerable amount of kinetic energy stored up in the rapidly moving valve in moving from the open to the closed position would cause stresses and strains in the valve and the valve seat, and would result in a permanent deformation of both these members. A few operations of the circuit interrupter would cause the valve to leak air or other gas. The present invention removes the problems outlined above in previous valve constructions. The circuit interrupter shown in Fig. 1 remains gas tight even though the heavy parts move rapidly and even though the interrupter has been subjected to many operations at high speed in life tests.

Figure 3:
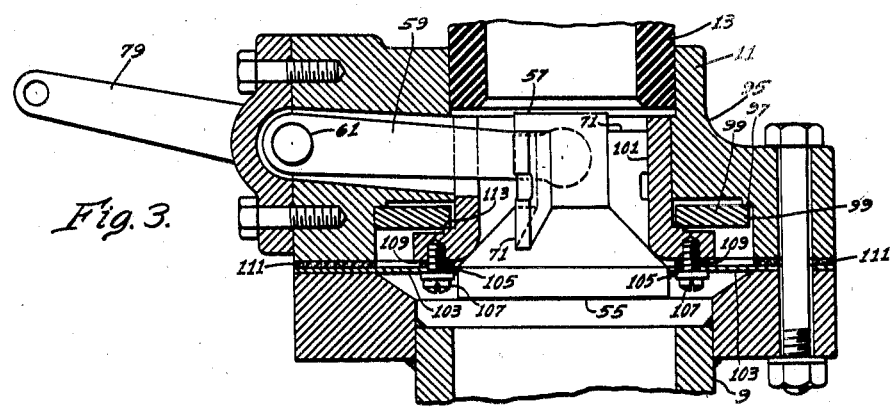
Fig. 3 is an enlarged elevational view, partly in section, of a modification of the present invention.

Fig. 3 illustrates a modification of the present invention. Here a valve casing 95 is so machined that there is provided a shoulder 97 upon which rests a flat spring washer 99. The energy of impact caused by the sudden stopping of the rapidly moving valve 55 is absorbed by the deflection of this flat spring washer 99. To prevent air or gas leakage between the seat insert 101 and the valve casing 95, a thin steel or other flexible metallic ring 103 is provided. This thin steel or metallic ring 103 has holes 105 bored near its inner periphery, through which pass screws 107 which secure the metallic ring 103 to the valve seat insert 101. A gasket of rubber or of a synthetic rubber such as polymerized chloroprene or polymerized chlorobutadiene, or a gasket of any flexible material, indicated by reference numeral 109, is used under metallic ring 103. Another gasket 111, made of flexible resilient material, is used between metal ring 103 and valve casing 95 to prevent gas leakage. The valve seat insert 101 is made a press fit in the valve casing 95 to reduce the oscillations occurring after impact. The damping of such oscillations is caused by the friction between the insert 101 and valve casing 95. A press fit may not be necessary in some cases where there may be sufficient damping in the valve mechanism itself to damp out the oscillations.

Instead of using the flat spring washer 99, one may use in its place a radially tapered spring washer, not shown. Where space is at a premium, the flat spring washer 99 may be so bored that its inner periphery is half as thick as its outer periphery. The shoulder 113 of insert 101 which rests on the spring washer 99 may then be so machined that when the valve is assembled, the overall height of the valve may be less than the construction illustrated in Fig. 3.

For one particular application of the construction illustrated in Fig. 3, for a valve travel of ½ inch, a pressure differential of 150 pounds per square inch, and an energy to be absorbed of 500 inch pounds, the calculated dimensions of the flat spring washer were as follows: Outer diameter—5½ inches; inside diameter—3¼ inches; thickness—½ inch; the thickness of the thin steel ring to prevent leakage—1/32 inch. By using these dimensions, the peak impact load could be reduced to a small fraction of that occurring in a solid valve seat.

Figure 4:
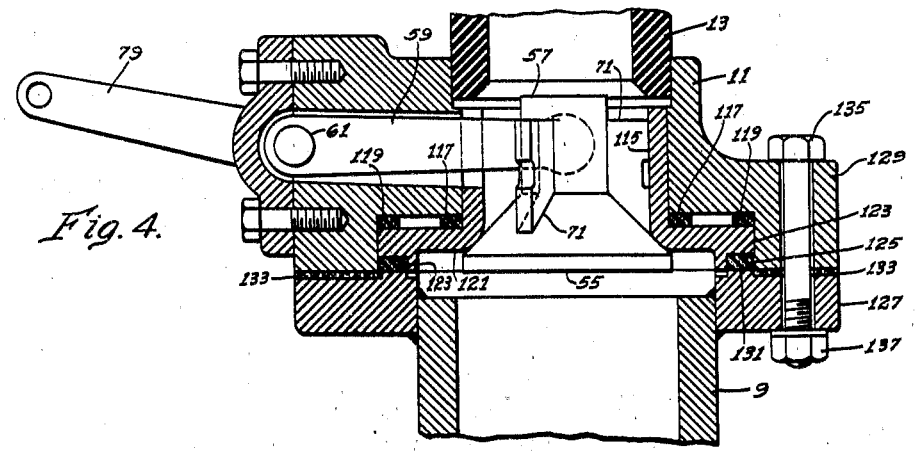
Fig. 4 is an enlarged elevational view, partly in section, of still another modification of the present invention.

Fig. 4 illustrates another modification of the present invention. In this modification the valve seat insert 115 floats in position and is not brazed into place at any point, nor is it fastened by screws to any thin washer. The insert 115 rests upon two elastic rings 117 and 119. When the valve closes, the kinetic energy of the moving valve 55 is largely adsorbed in two ways. First, the elastic rings 117 and 119 are compressed, and this compression absorbs considerable kinetic energy. Secondly, the insert 115 itself acts as a compression spring similar to the construction illustrated in Fig. 1 and Fig. 2. Consequently, because of these two resilient features of the construction illustrated in Fig. 4, there is no permanent deformation of either the valve 55 or the insert 115. The friction between the insert 115 and the valve casing 129 tends to damp the oscillations on closing where the external valve mechanism does not sufficiently damp the oscillations.

It will be noted in Fig. 4 that the flange portion 121 of the insert 115 is extended outwardly considerably farther than in the other illustrated constructions. By machining out of the flange portion 121 of insert 115 a retaining groove 123 and inserting therein a resilient ring-shaped gasket 125, it is possible to have a gas-tight seal between the insert 115 and flange 127 of the conduit 9 leading out of the storage tank 7 (not shown in Fig. 4). It will be observed that automatically there is also provided a gas-tight seal between the valve casing 129 and the flange 127 of conduit 9. By machining out a ridge 131 on the flange portion 127 of conduit 9 and by placing a flexible ring-shaped gasket 133 outside the ridge 131, it will be seen that by tightening up on the flange bolts 135 and the flange nuts 137, the ridge 131 will tend to bite into the retaining groove 123 of insert 115 and that both gaskets 125 and 133 will be compressed. The result is a gas-tight joint. This construction makes it unnecessary to make the valve casing 129 out of expensive valve bronze in order to obtain an airtight casting 129 since the gas does not come in contact with valve casting 129.

The different constructions illustrated in Figs. 2, 3 and 4 can be used on any apparatus, not necessarily electrical, which uses valves and where the kinetic energies involved in the moving valve parts tend to deform the valve parts. The present invention is not confined in its application to circuit interrupters. For purposes of illustration only has the invention been applied to circuit interrupters.

Although we have shown and described specific structures, it is to be understood that the same were for the purpose of illustration and that changes and modifications may be made by those skilled in the art without departing from the spirit and scope of the appended claims.

We claim as our invention:

1. In a valve mechanism, a casing for said valve mechanism, a movable valve, a seat for said valve, said seat comprising a tubular member frictionally engaging said casing to assist in damping the oscillations during the closing of said valve, an offstanding supporting portion for said seat, the outer portion of said supporting portion remaining relatively fixed in position with respect to the inner portion of said supporting portion adjacent said seat, the resiliency of said supporting portion being sufficient to absorb the kinetic energy of said movable valve when the latter is moved to the closed position without substantial deformation.

2. In a valve mechanism, a movable valve, a seat for said valve, a valve casing, said seat comprising a tubular member frictionally engaging said casing to assist in damping the seat oscillations during closing, annular flanging means for resiliently supporting said seat, said flanging means being of such width and so arranged that the outer portion thereof remains in a relatively fixed position with respect to the inner portion thereof during closing of said valve, said flanging means being sufficiently resilient to absorb the kinetic energy of the moving valve during a closing operation without substantial deformation.

3. In a valve mechanism, a movable valve, a resiliently mounted seat for said valve, a valve casing, said seat comprising an elongated metallic tubular member, said member having one end portion thereof frictionally engaging said casing to damp the oscillations during closing, the other end of said metallic tubular member forming the seat for said valve, metallic flanging means adjacent the seat end of said metallic tubular member for resiliently supporting the same, said flanging means being so disposed that the outer portion thereof remains relatively fixed in position with respect to the inner portion thereof adjacent said seat during closing of said valve, said flanging means being sufficiently resilient to absorb the kinetic energy of said valve closing without being permanently deformed.

4. In a valve mechanism, a movable valve and a resiliently mounted seat therefor, and means frictionally engaging said resiliently mounted seat to assist in damping the oscillations in said seat during the closing operation of said valve.

5. In a valve mechanism, a housing for said valve mechanism, a movable valve having considerable kinetic energy during the closing operation, a seat for said movable valve inserted within said valve housing, said seat comprising a flanged member, said flanged member being soldered to said housing by the circumferential portion of its flange, an air gap between said housing and the flange portion of said member, and a dam circling the flange portion of said member to prevent solder flowing in said air space.

6. In a valve mechanism, a casing for said valve mechanism, a movable valve, a seat for said movable valve, said seat comprising a flanged member inserted within said casing, a resilient washer-shaped element, said flanged member being resiliently supported by the flange portion thereof by means of said resilient washer-shaped element, and means for preventing the medium passing through the valve mechanism from entering the space between the outer portion of said flanged member and said casing.

7. In a valve mechanism, a casing for said valve mechanism, a movable valve, a seat for said movable valve, said seat comprising a flanged member inserted within said casing, a metallic washer-shaped element, said flanged member being resiliently supported at the flange portion thereof by said washer-shaped element, a thin washer-shaped metallic member secured to the flange portion of said flanged member and also pressed against said casing to prevent the medium passing through the valve from entering the space between the casing and the outer portion of said flanged member.

8. In a valve mechanism, a valve casing forming a shoulder, a valve, a seat for said valve, said seat comprising a flanged member inserted within said casing, a ring-shaped spring member resting on the shoulder of said valve casing and supporting said flanged member by the flange portion thereof, a thin washer-shaped member securely fastened to the flange portion of said flanged member and also pressed against said casing to prevent leakage of the medium passing through the valve between the flanged member and the valve casing.

9. In a valve mechanism, a valve, a valve casing, a seat for said valve, said seat comprising a flanged member inserted in said valve casing, one or more resilient rings to support the flange portion of said flanged member, said one or more resilient rings and said flanged member both assisting in the formation of a resilient seat for said valve to absorb the kinetic energy of the valve during closing.

10. In a valve mechanism, a flanged housing for said valve mechanism, a flanged conduit leading to said housing, a valve, a seat for said valve, said seat comprising a flanged tubular member inserted in said housing, said flanged tubular member being flexibly supported by the flange portion thereof, said flanged tubular member having a groove cut in said flange portion, flexible material placed in said groove, and means for securing said flanged conduit to said flanged housing and at the same time compressing said flexible material placed in said groove to form a gas-tight joint between said flanged conduit and said flanged tubular member.

11. In a valve mechanism, a movable valve and a resiliently mounted seat therefor, a washer-shaped metallic member, said seat being resiliently supported by said washer-shaped metallic member.

12. In a valve mechanism, a movable valve, a seat for said valve, said seat comprising an annular member having a considerable flange portion, elastic means for supporting said member by the flange portion thereof, the flange portion and said elastic means both cooperating to render said seat resilient to take up the shock on closing without permanent deformation.

ARTHUR M. WAHL.
FREDERICK B. JOHNSON.